United States Patent
Shamoto et al.

(10) Patent No.: US 12,023,741 B2
(45) Date of Patent: Jul. 2, 2024

(54) CUTTING METHOD USING DIAMOND CUTTING TOOL

(71) Applicant: National University Corporation Tokai National Higher Education and Research System, Nagoya (JP)

(72) Inventors: Eiji Shamoto, Nagoya (JP); Hongjin Chung, Nagoya (JP); Takehiro Hayasaka, Nagoya (JP)

(73) Assignee: NATIONAL UNIVERSITY CORPORATION TOKAI NATIONAL HIGHER EDUCATION AND RESEARCH SYSTEM, Aichi (JP)

(*) Notice: Subject to any disclaimer, the term of this patent is extended or adjusted under 35 U.S.C. 154(b) by 786 days.

(21) Appl. No.: 17/196,207

(22) Filed: Mar. 9, 2021

(65) Prior Publication Data
US 2021/0187622 A1 Jun. 24, 2021

Related U.S. Application Data

(63) Continuation of application No. PCT/JP2019/008538, filed on Mar. 5, 2019.

(51) Int. Cl.
*B23B 27/14* (2006.01)
*B23B 1/00* (2006.01)

(52) U.S. Cl.
CPC ............ *B23B 27/148* (2013.01); *B23B 1/00* (2013.01); *B23B 2226/31* (2013.01)

(58) Field of Classification Search
CPC ... B23B 27/148; B23B 27/20; B23B 2222/84; B23B 2226/31; B23C 2226/31; B23C 2222/84
See application file for complete search history.

(56) References Cited

U.S. PATENT DOCUMENTS

2016/0032442 A1* 2/2016 Williams .................. C23C 8/26
148/225

FOREIGN PATENT DOCUMENTS

| JP | 2006192556 A | 7/2006 | |
|---|---|---|---|
| JP | 2014214076 A | 11/2014 | |
| JP | 2018135596 A | 8/2018 | |
| WO | WO-2018101347 A1 * | 6/2018 | ............... B01J 3/06 |

OTHER PUBLICATIONS

Search Report (with English translation) issued in corresponding International application No. PCT/JP2019/008538 with a mailing date of May 7, 2019 (4 pages).

(Continued)

*Primary Examiner* — Nicole N Ramos
(74) *Attorney, Agent, or Firm* — Muncy, Geissler, Olds & Lowe, P.C.

(57) ABSTRACT

Provided is a cutting method of cutting, with a diamond cutting tool, a metal material having at least a solid solution layer on a surface, the solid solution layer containing nitrogen atoms as interstitial solid solution atoms. In this method, cutting is performed in a region where a nitrogen concentration is equal to or greater than a predetermined concentration, and cutting is not performed in a region where the nitrogen concentration is less than the predetermined concentration.

11 Claims, 9 Drawing Sheets

(56) References Cited

OTHER PUBLICATIONS

Written Opinion of the International Searching Authority (with English translation) issued in corresponding International application No. PCT/JP2019/008538 with a mailing date of May 7, 2019 (11 pages).
International Preliminary Report on Patentability (with English translation) issued in corresponding International application No. PCT/JP2019/008538 with a completion date of Sep. 1, 2020 (11 pages).
Office Action and Search Report issued in Japanese Patent Application No. 2021-014349 mailed Sep. 14, 2021 with English translation, 5 pages.

* cited by examiner

FIG.9

CUTTING METHOD USING DIAMOND CUTTING TOOL

CROSS REFERENCE TO RELATED APPLICATIONS

This application is based upon and claims the benefit of priority from International Application No. PCT/JP2019/008538, filed on Mar. 5, 2019, the entire contents of which are incorporated herein by reference.

BACKGROUND

The present disclosure relates to a cutting method using a diamond cutting tool.

JP2018-135596 A discloses a method of reducing surface roughness of a steel material subjected to machining. In this method, a solid solution layer containing nitrogen atoms as interstitial solid solution atoms is formed on at least a surface of a steel material by the electron-beam-excited-plasma nitriding method under a condition (a) and/or a condition (b), and is then machined with a diamond cutting tool.

The condition (a) is that the electron-beam-excited-plasma nitriding method is performed at a pressure equal to or less than 10 Pa, and the condition (b) is that potential of the steel material based on plasma potential in the electron-beam-excited-plasma nitriding method is in a range of from −300 to 300V.

SUMMARY

Even when the surface of the steel material is subjected to diffusion nitriding by the electron-beam-excited-plasma nitriding method or the like, a low nitrogen concentration causes carbon atoms of the diamond cutting tool to enter the steel material to cause tool wear. Therefore, the present discloser has obtained conditions for diffusion nitrogen concentration suitable for cutting with a diamond cutting tool through experiments, and has devised a cutting method based on the nitrogen concentration.

The present disclosure has been made in view of such a circumstance, and it is therefore an object of the present disclosure to provide a cutting method of cutting a metal material subjected to diffusion nitriding with a diamond cutting tool based on a nitrogen concentration.

Means to Solve the Problem

In order to solve the above-described problems, one aspect of the present disclosure relates to a cutting method including cutting a solid solution layer of a metal material from a surface of the metal material with a diamond cutting tool, the metal material having at least the solid solution layer on the surface, the solid solution layer containing nitrogen atoms as interstitial solid solution atoms. In this method, cutting is performed in a region where a nitrogen concentration is equal to or greater than a predetermined concentration, and cutting is not performed in a region where the nitrogen concentration is less than the predetermined concentration.

Another aspect of the present disclosure is also a cutting method including cutting a solid solution layer of a metal material from a surface of the metal material with a diamond cutting tool, the metal material having at least the solid solution layer on the surface, the solid solution layer containing nitrogen atoms as interstitial solid solution atoms. In this method, after cutting a portion exhibiting a peak of nitrogen concentration, the cutting is terminated before reaching a region where the nitrogen concentration is less than a predetermined concentration.

Yet another aspect of the present disclosure also relates to a cutting method including cutting a solid solution layer of a metal material from a surface of the metal material with a diamond cutting tool, the metal material having at least the solid solution layer on the surface, the solid solution layer containing nitrogen atoms as interstitial solid solution atoms. In this method, a region where a nitrogen concentration is equal to or greater than a first concentration is defined as a cutting-allowed range, and cutting is performed in a region where the nitrogen concentration is equal to or greater than a second concentration greater than the first concentration.

DETAILED DESCRIPTION

Figure 1:
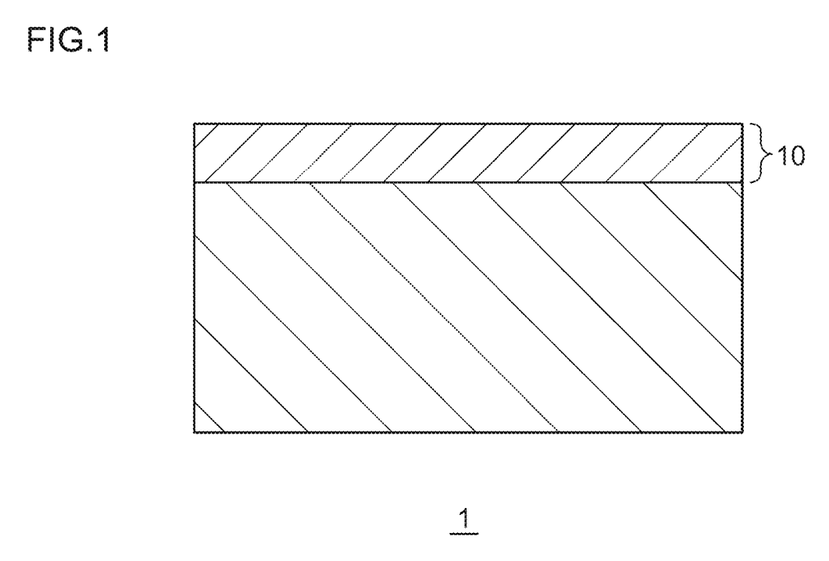
FIG. 1 is a diagram showing a cross section of a metal material to be cut.

FIG. 1 shows a cross section of a metal material to be cut with a diamond cutting tool. A metal material 1 has at least a solid solution layer 10 on a surface, the solid solution layer 10 containing nitrogen atoms as interstitial solid solution atoms. The metal material 1 is an iron-based material that is a steel material in the embodiment, but may be a different type of metal. The embodiment provides a cutting method of cutting the solid solution layer 10 of the metal material 1 having at least the solid solution layer 10 on the surface from the surface with the diamond cutting tool. This cutting may be mirror finishing.

The solid solution layer 10 is formed by diffusing and incorporating nitrogen atoms into the surface of the metal material 1. The solid solution layer 10 may be formed, for example, by disposing the metal material 1 in a dilute gas containing nitrogen atoms and irradiating the dilute gas with an electron beam for excitation.

It is preferable that the solid solution layer 10 be substantially free of iron nitride. When the solid solution layer 10 contains iron nitrides, a cutting edge of the diamond cutting tool may be damaged during cutting. Therefore, forming the solid solution layer 10 without containing iron nitrides brings about an advantage that the life of the diamond cutting tool can be prolonged, and surface roughness of a metal product after cutting can be reduced.

The solid solution layer 10 may be formed by the electron-beam-excited-plasma nitriding method disclosed in JP2018-135596 A. The electron-beam-excited-plasma nitriding method is a method in which nitrogen atoms enter and diffuse from the surface of the metal material 1 using plasma containing nitrogen atoms. Since the solid solution layer 10 formed by the electron-beam-excited-plasma nitriding method does not contain iron nitrides, the electron-beam-excited-plasma nitriding method can be said to be a preferable forming method.

The present discloser cut the solid solution layer 10 subjected to electron-beam-excited-plasma nitriding with the diamond cutting tool and examined a relationship between tool wear and nitrogen concentration.

Figure 2A:
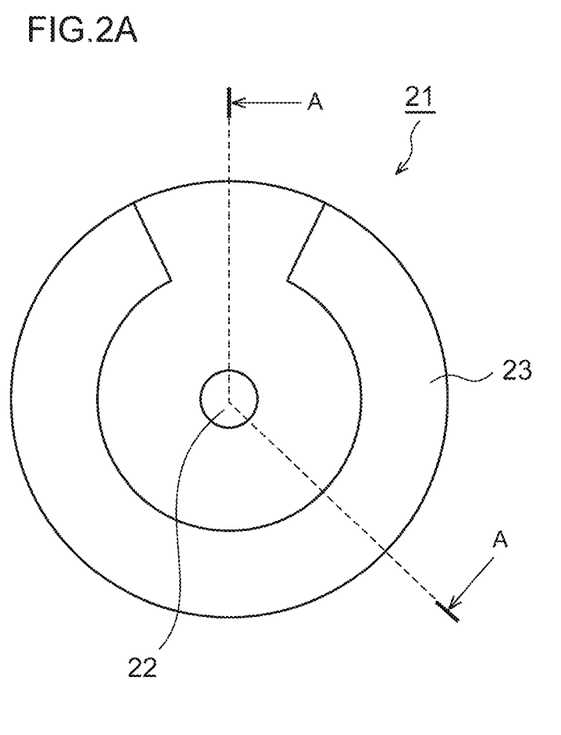
FIGS. 2A and 2B are diagrams showing a workpiece subjected to electron-beam-excited-plasma nitriding.
Figure 2B:
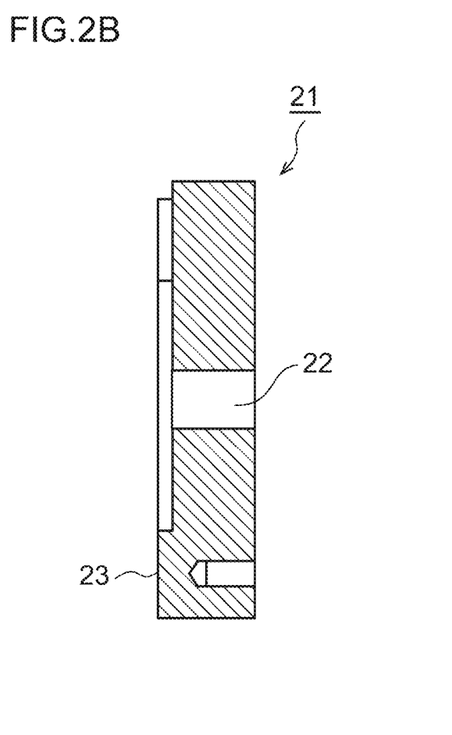

FIG. 2A shows a workpiece subjected to electron-beam-excited-plasma nitriding, and FIG. 2B shows an A-A cross section of the workpiece 21. The workpiece 21 is made of a raw material of SUS420J2. The workpiece 21 has a disk shape with a diameter of 50 mm and a hole 22 in a center. During experiment, a spindle of a machining apparatus is attached into the hole 22 and rotated. The diamond cutting tool is moved relative to a surface 23 of the workpiece 21 that is rotating by a feed mechanism of the machining apparatus and cuts the surface 23 of the workpiece 21.

Figure 3:
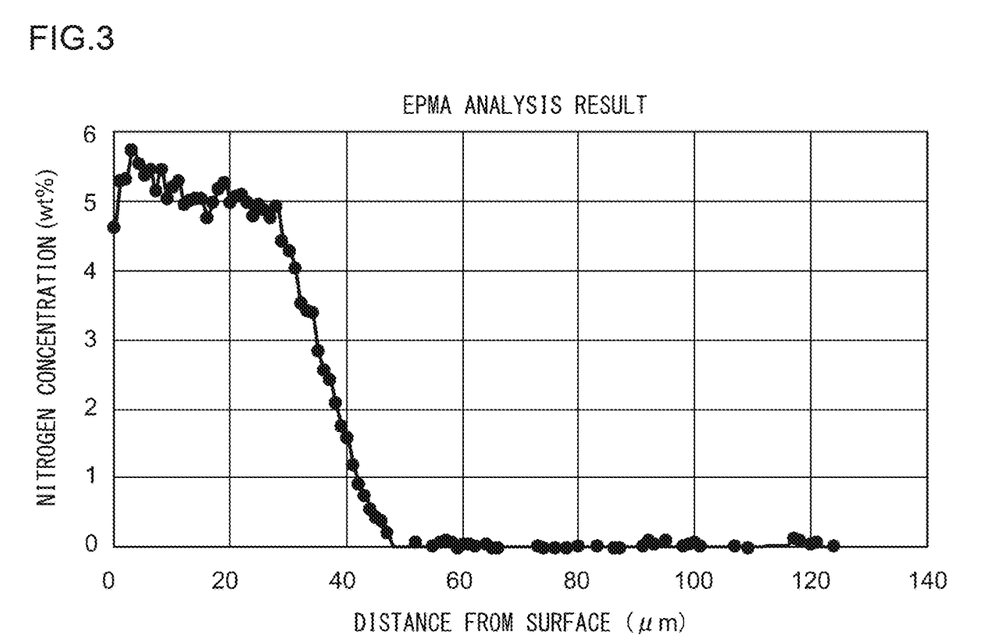
FIG. 3 is a diagram showing an analysis result of nitrogen concentration.

Note that, in this experiment, a plurality of the workpieces 21 subjected to electron-beam-excited-plasma nitriding under the same conditions were prepared, one of the workpieces was cut from the surface in a depth direction, and the nitrogen concentration was measured from the surface. FIG. 3 shows an analysis result of the nitrogen concentration from an electron beam microanalyzer (EPMA). As shown in the analysis result, since nitrogen atoms enter from the surface, the nitrogen concentration in the surface is high, and the nitrogen concentration decreases as the depth from the surface increases. According to electron-beam-excited-plasma nitriding conditions for the workpiece 21 used in this experiment, the surface of the solid solution layer 10 is in a state where nitrogen atoms are incorporated in a saturated manner, and a portion of the workpiece 21 located a distance (depth) of about 50 μm below the surface has the nitrogen concentration of almost 0 percent by weight. Note that a nitrogen concentration profile, that is, the relationship between the nitrogen concentration and the distance (depth) from the surface depends on the nitriding conditions, and thus the solid solution layer 10 can be formed deeper with longer treatment time, for example. Note that the longer the treatment time is, the wider the saturated region becomes, but the maximum nitrogen concentration (peak concentration) in the saturated region does not change.

It is known that iron nitrides are produced when the nitrogen concentration exceeds 6 percent by weight. The iron nitrides increase the possibility of damaging the diamond cutting tool during cutting. Therefore, the workpiece 21 is subjected to electron-beam-excited-plasma nitriding such that the nitrogen concentration of the solid solution layer 10 is equal to or less than 6 percent by weight.

Figure 4:
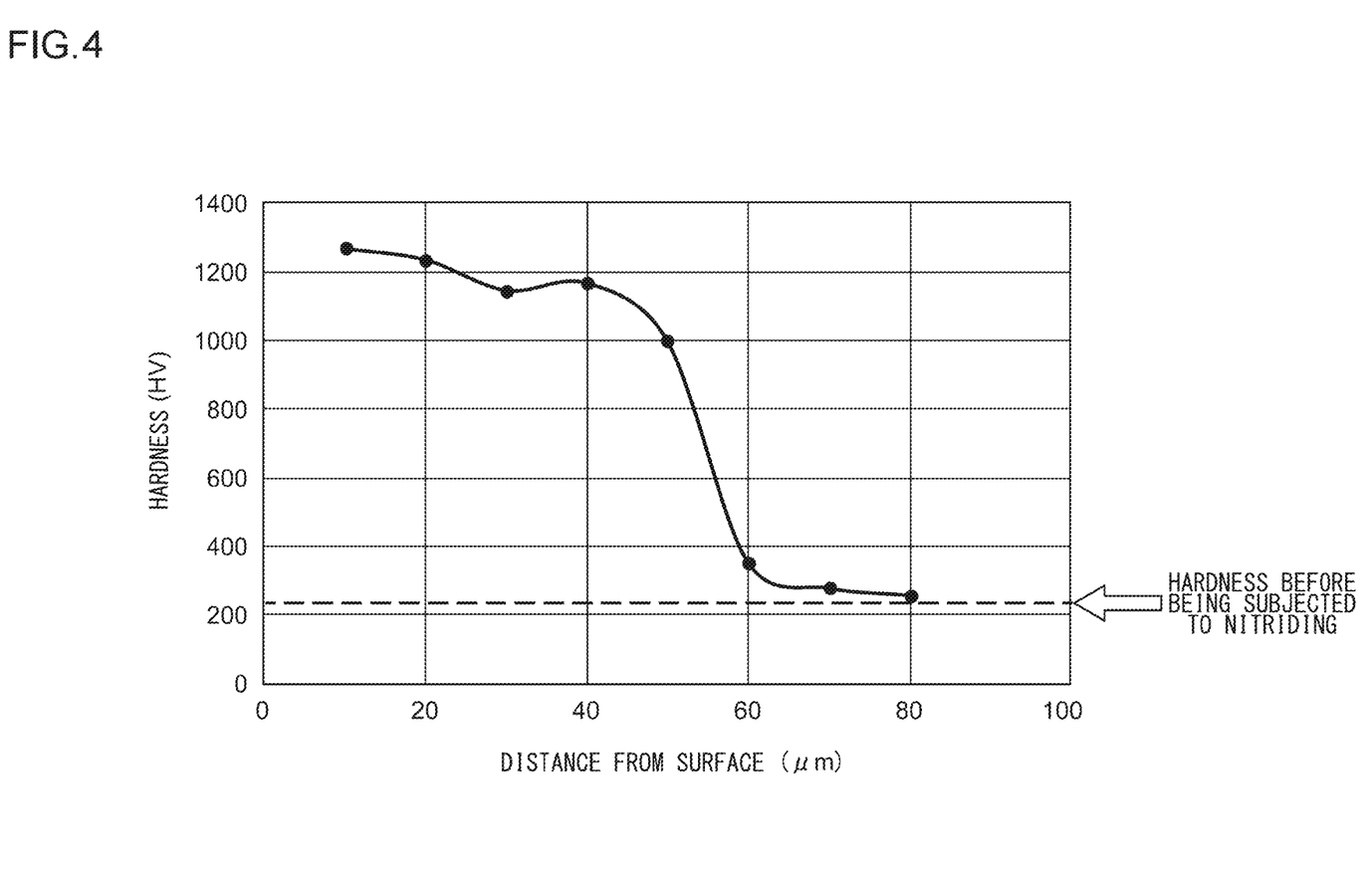
FIG. 4 is a diagram showing a measurement result of hardness of the workpiece.

FIG. 4 shows a measurement result of hardness of the workpiece 21. In the experiment, tool wear was observed, and at the same time, surface hardness was measured using a micro hardness tester. From this measurement result, it is confirmed that the nitriding increases the hardness near the surface. Further, with reference to the nitrogen concentration profile shown in FIG. 3, it is confirmed that the hardness decreases as the nitrogen concentration decreases. High surface hardness is suitable when the metal material 1 is used for a mold or the like.

In the experiment, the surface of the workpiece 21 was cut one layer by one layer a plurality of times, and tool wear was observed using a differential interference contrast microscope. Cutting conditions in the experiment are as follows:

Depth of cut (for one layer): 2 to 3 μm;
Tool feed amount per rotation: 5 μm;
Rotation speed: 80 rpm;
Average cutting speed: 10 m/min; and
Cutting length: 188 m/layer.

In order to observe tool wear, the workpiece 21 was partially removed by a depth of about 10 μm from the surface by pre-machining to smooth a cutting surface.

Figure 5:
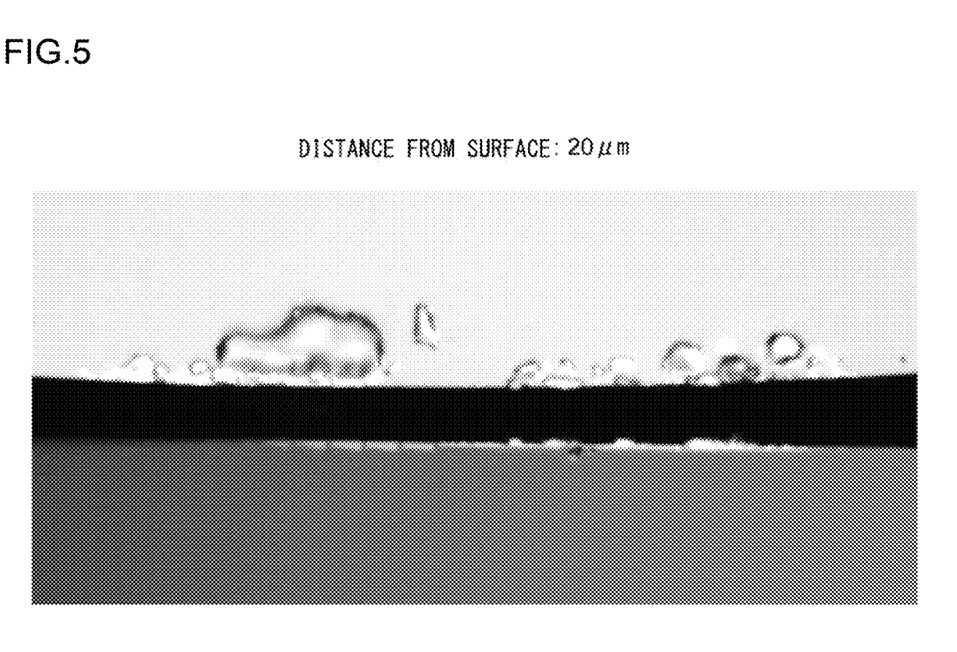
FIG. 5 is a diagram showing an observation image when a distance from a surface is 20 μm.
Figure 6:
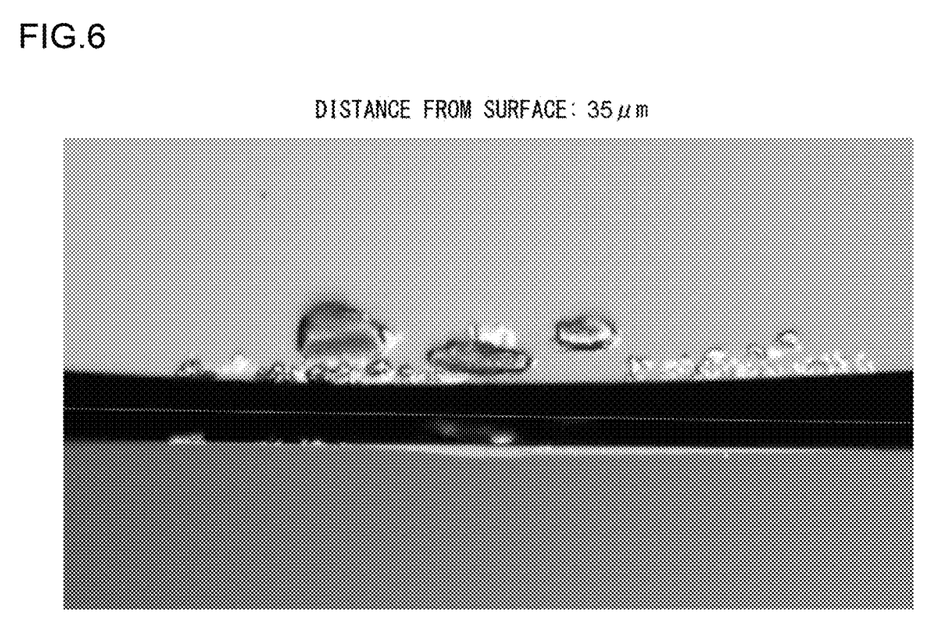
FIG. 6 is a diagram showing an observation image when the distance from the surface is 35 μm.
Figure 7:
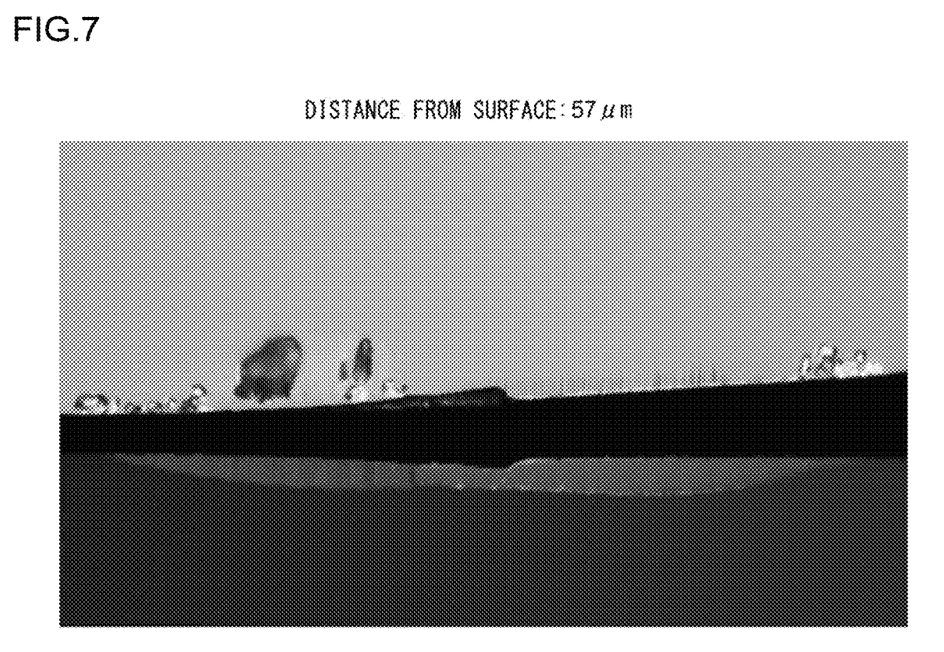
FIG. 7 is a diagram showing an observation image when the distance from the surface is 57 μm.

FIG. 5 to FIG. 7 show observation images representing a rake face and flank taken by the differential interference contrast microscope. In FIG. 5 to FIG. 7, each observation image results from combining an upper observation image representing the rake face and a lower observation image representing the flank. The differential interference contrast microscope splits light from a light source into two components through a Nomarski prism to illuminate a sample to highlight unevenness of a surface of the sample using interference that occurs when two observation lights reflected from the sample are combined. A change in brightness is observed at an edge of the rake face and/or the flank in the image taken by the differential interference contrast microscope indicates that wear occurs on the rake face and/or the flank.

FIG. 5 shows an observation image when the distance from the surface is 20 μm. In this observation image, no change in brightness occurs at the edges of the rake face and the flank, and thus no wear occurs.

FIG. 6 shows an observation image when the distance from the surface is 35 μm. In this observation image, the edge of the flank is bright, and thus wear occurs in the vicinity of the edge portion. Note that when the distance from the surface was less than 35 μm, no change in brightness occurs at the edge portion, so that it was observed that wear starts occurring from a portion at the distance of 35 μm from the surface. Note that since wear progresses from a cutting edge tip, wear on the flank side tends to be observed earlier than wear on the rake face side.

FIG. 7 shows an observation image when the distance from the surface is 57 μm. In this observation image, it is observed that a change in brightness at the edges of the rake face and the flank face occurs, and thus large wear occurs on the rake face and the flank.

In this experiment, a change in cutting force when cutting each layer was measured, and roughness of a finished surface after cutting each layer was measured. As a result, when the distance from the surface was equal to or greater than 35 μm, it was measured that the cutting force in a deep-cutting direction suddenly increases and the roughness of the finished surface increases. This means that tool wear started occurring when the cutting distance from the surface was 35 μm.

Figure 8:
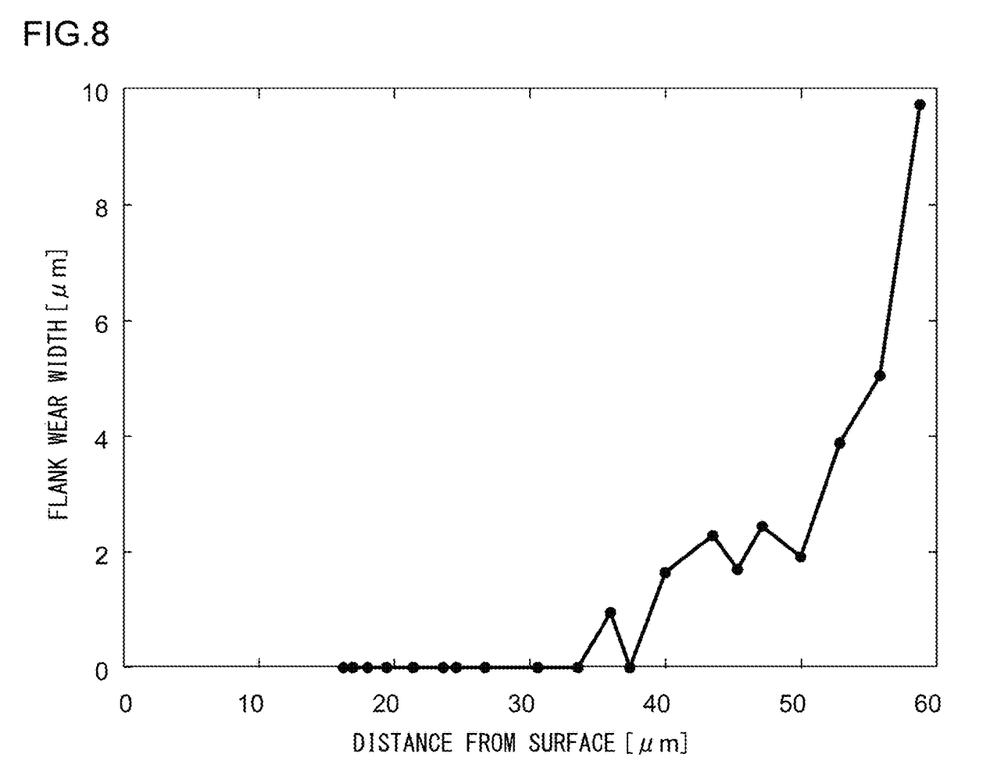
FIG. 8 is a diagram showing a relationship between the distance from the surface and a flank wear width.

FIG. 8 shows a relationship between the distance from the surface and a flank wear width. The flank wear width is the maximum value of a flank wear length when one layer (188 m) is cut. It is observed that wear occurs from a portion at the distance of 35 μm from the surface.

Figure 9:
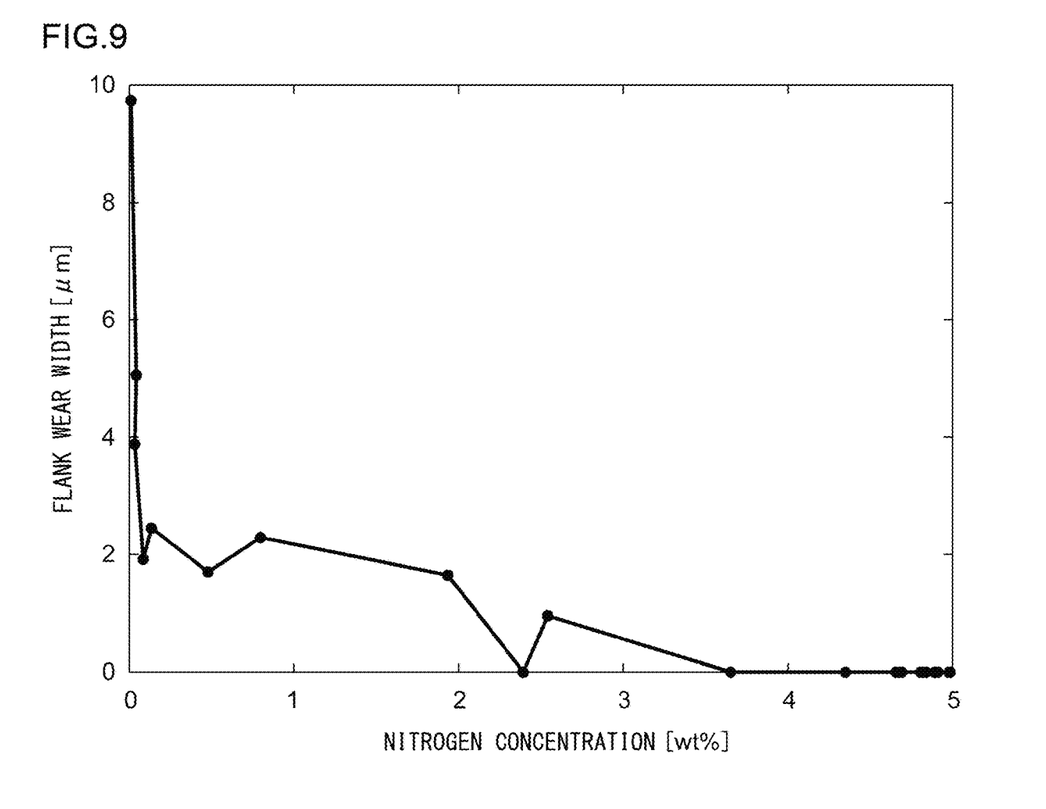
FIG. 9 is a diagram showing a relationship between the nitrogen concentration and the flank wear width.

FIG. 9 shows a relationship between the nitrogen concentration and the flank wear width. This relationship is derived from the nitrogen concentration profile shown in FIG. 3 and the experimental result shown in FIG. 8, and it was confirmed that tool wear occurs in a region where the nitrogen concentration is less than a predetermined concentration, and no tool wear occurs in a region where the nitrogen concentration is equal to or greater than the predetermined concentration. This concentration serving as a threshold is determined based on the nitrogen concentration (peak concentration) in a region where nitrogen atoms are incorporated in a saturated manner, as will be described later. In the cutting method of cutting the metal material 1 with the diamond cutting tool, for the purpose of preventing or reducing tool wear, it is preferable that cutting be performed in a region where the nitrogen concentration is equal to or greater than the predetermined concentration, and no cutting be performed in a region where the nitrogen concentration is less than the predetermined concentration. From the viewpoint of the nitrogen concentration profile, it is preferable that, in the cutting method of cutting the metal material 1, cutting be first performed on a portion exhibiting a peak of nitrogen concentration and then be terminated before reaching the region where the nitrogen concentration is less than the predetermined concentration.

In order to prevent tool wear due to carbon atoms entering the solid solution layer 10, it is preferable that cutting be performed in a region where the nitrogen concentration is equal to or greater than about 3.5 percent by weight (see FIG. 9), but when slight tool wear is acceptable, cutting may be performed in a region where the nitrogen concentration is equal to or greater than a nitrogen concentration less than about 3.5 percent by weight. For example, when flank wear of 2 μm is acceptable for a cutting length of 188 m, cutting may be performed in a region where the nitrogen concentration is equal to or greater than about 2 percent by weight.

The present discloser have found that the nitrogen concentration in which tool wear can be prevented is determined as a relative value of the nitrogen concentration in a region where nitrogen atoms are incorporated in a saturated manner. As shown in FIG. 3, the nitrogen concentration in the saturated region is about 5 percent by weight in the experiment, and therefore cutting is performed in a region where the nitrogen concentration is equal to or greater than 70 percent (3.5 percent by weight/5 percent by weight) of the nitrogen concentration in the saturated region, making it possible to prevent tool wear. Similarly, when flank wear of 2 μm is acceptable for a cutting length of 188 m, cutting is performed in a region where the nitrogen concentration is equal to or greater than 40 percent (2 percent by weight/5 percent by weight) of the nitrogen concentration in the saturated region, making it possible to suppress tool wear.

Note that, in the cutting method of cutting the metal material 1 with the diamond cutting tool, for the purpose of preventing or reducing tool wear, a region where the nitrogen concentration is equal to or greater than a first concentration is defined as a cutting-allowed range, and a region where the nitrogen concentration is less than the first concentration is defined as a cutting-disallowed range, and cutting may be performed in a region where the nitrogen concentration is equal to or greater than a second concentration greater than the first concentration. As described above, the first concentration is determined based on the nitrogen concentration in the saturated region and may be set to 3.5 percent by weight that is 70 percent of the nitrogen concentration in the saturated region. As shown in FIG. 4, the higher the nitrogen concentration is, the higher the surface hardness becomes, and high surface hardness is suitable for a surface of a mold or the like. Therefore, in order to prevent the diamond cutting tool from being worn and secure high surface hardness, it is preferable that cutting work be performed in a region where the nitrogen concentration is equal to or greater than the second concentration greater than the first concentration.

In order to implement the cutting method according to the embodiment, a cutting contractor designates the nitrogen concentration profile of the solid solution layer 10 of the metal material 1 that is a to-be-cut object (workpiece) for a nitriding contractor. That is, after a nitrogen concentration in a finished surface of a final product is designated, the nitriding contractor is requested to nitride the to-be-cut object. The nitriding contractor may determine nitriding conditions in accordance with a distance between the finished surface and a surface of the to-be-cut object such that the finished surface has the designated nitrogen concentration and form the solid solution layer 10 without containing iron nitrides.

The outline of aspects of the present disclosure is as follows. One aspect of the present disclosure is a cutting method including cutting a solid solution layer of a metal material from a surface of the metal material with a diamond cutting tool, the metal material having at least the solid solution layer on the surface, the solid solution layer containing nitrogen atoms as interstitial solid solution atoms. In this method, cutting is performed in a region where a nitrogen concentration is equal to or greater than a predetermined concentration, and cutting is not performed in a region where the nitrogen concentration is less than the predetermined concentration. Determining a to-be-cut region based on the nitrogen concentration suppresses wear of the diamond cutting tool and thus makes it possible to prolong the tool life.

Another aspect of the present disclosure is also a cutting method including cutting a solid solution layer of a metal material from a surface of the metal material with a diamond cutting tool, the metal material having at least the solid solution layer on the surface, the solid solution layer containing nitrogen atoms as interstitial solid solution atoms. In this method, after cutting a portion exhibiting a peak of nitrogen concentration, the cutting is terminated before reaching a region where the nitrogen concentration is less than a predetermined concentration. Determining a to-be-cut region based on the nitrogen concentration suppresses wear of the diamond cutting tool and thus makes it possible to prolong the tool life.

Of the metal material, a surface of the solid solution layer is in a state where the nitrogen atoms are incorporated in a saturated manner, and the predetermined concentration may be determined based on a nitrogen concentration in the saturated region. At this time, the predetermined concentration may be determined to be equal to or greater than 70% of the nitrogen concentration in the saturated region.

Yet another aspect of the present disclosure is also a cutting method including cutting a solid solution layer of a metal material from a surface of the metal material with a diamond cutting tool, the metal material having at least the solid solution layer on the surface, the solid solution layer containing nitrogen atoms as interstitial solid solution atoms. In this method, a region where a nitrogen concentration is equal to or greater than a first concentration is defined as a cutting-allowed range, and cutting is performed in a region where the nitrogen concentration is equal to or greater than a second concentration greater than the first concentration. Defining the cutting-allowed range based on the nitrogen concentration and determining a to-be-cut region based on the cutting-allowed range suppresses wear of the diamond cutting tool and thus makes it possible to prolong the tool life.

Of the metal material, a surface of the solid solution layer is in a state where the nitrogen atoms are incorporated in a saturated manner, and the first concentration may be determined based on a nitrogen concentration in the saturated region. At this time, the first concentration may be determined to be equal to or greater than 70% of the nitrogen concentration in the saturated region.

What is claimed is:

1. A cutting method comprising cutting with a diamond cutting tool that is worn due to movement of carbon atoms to a to-be-cut object,
cutting a solid solution layer of a metal material from a surface of the metal material with the diamond cutting tool, the metal material having at least the solid solution layer on the surface, the solid solution layer containing nitrogen atoms as interstitial solid solution atoms,
wherein the cutting is performed in a region where a nitrogen concentration is equal to or less than a predetermined first concentration and is equal to or greater than a predetermined second concentration, and the cutting is not performed in a region where the nitrogen concentration is less than the predetermined second concentration.

2. A cutting method comprising cutting with a diamond cutting tool that is worn due to movement of carbon atoms to a to-be-cut object,
cutting a solid solution layer of a metal material from a surface of the metal material with the diamond cutting tool, the metal material having at least the solid solution layer on the surface, the solid solution layer containing nitrogen atoms as interstitial solid solution atoms,
after cutting a portion exhibiting a peak of nitrogen concentration that is equal to or less than a predetermined first concentration, the cutting is terminated before reaching a region where the nitrogen concentration is less than a predetermined second concentration.

3. The cutting method according to claim 1, wherein
a surface of the solid solution layer is in a state where nitrogen atoms are incorporated in a saturated manner, and
the predetermined second concentration is determined based on a nitrogen concentration in the saturated region.

4. The cutting method according to claim 3, wherein
the predetermined second concentration is determined to be equal to or greater than 70% of the nitrogen concentration in the saturated region.

5. A cutting method comprising cutting with a diamond cutting tool that is worn due to movement of carbon atoms to a to-be-cut object,
cutting a solid solution layer of a metal material from a surface of the metal material with the diamond cutting tool, the metal material having at least the solid solution layer on the surface, the solid solution layer containing nitrogen atoms as interstitial solid solution atoms,
a region where a nitrogen concentration is equal to or less than a predetermined first concentration and is equal to or greater than a second concentration is defined as a cutting-allowed range, and the cutting is performed in a region where the nitrogen concentration is equal to or greater than a third concentration greater than the second concentration.

6. The cutting method according to claim 5, wherein
a surface of the solid solution layer is in a state where nitrogen atoms are incorporated in a saturated manner, and
the second concentration is determined based on a nitrogen concentration in the saturated region.

7. The cutting method according to claim 6, wherein
the second concentration is determined to be equal to or greater than 70% of the nitrogen concentration in the saturated region.

8. The cutting method according to claim 1, wherein
the cutting method is a method of mirror-finishing the metal material.

9. The cutting method according to claim 1, wherein
the metal material is an iron-based material.

10. The cutting method according to claim 1, wherein
the first concentration serves as an upper limit of concentration without nitrides of the metal material.

11. The cutting method according to claim 10, wherein
when the metal material is an iron-based material, the first concentration is 6 percent by weight.

* * * * *